(12) United States Patent
Aoyagi et al.

(10) Patent No.: US 7,659,018 B2
(45) Date of Patent: Feb. 9, 2010

(54) FUEL CELL POWER CONTROL UNIT

(75) Inventors: Satoshi Aoyagi, Wako (JP); Hibiki Saeki, Wako (JP); Yusuke Hasegawa, Wako (JP); Kazuo Kotaka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 433 days.

(21) Appl. No.: 09/988,452

(22) Filed: Nov. 16, 2001

(65) Prior Publication Data

US 2002/0114986 A1 Aug. 22, 2002

(30) Foreign Application Priority Data

Nov. 17, 2000 (JP) ............................ P2000-351129
Oct. 5, 2001 (JP) ............................ P2001-310600

(51) Int. Cl.
*H01M 8/04* (2006.01)
*G01R 21/06* (2006.01)

(52) U.S. Cl. .............................. 429/23; 429/13; 702/64

(58) Field of Classification Search .................... 429/23
See application file for complete search history.

(56) References Cited

U.S. PATENT DOCUMENTS

| 5,964,309 A * | 10/1999 | Kimura et al. ............. 180/65.8 |
| 6,572,993 B2 * | 6/2003 | Singh et al. .................... 429/24 |
| 2001/0004170 A1 * | 6/2001 | Schienbein et al. ........... 307/18 |

2002/0038732 A1 * 4/2002 Sugiura et al. ............. 180/65.2

FOREIGN PATENT DOCUMENTS

| CA | 2271498 | 11/1999 |
| JP | 63-45763 | 2/1988 |
| JP | 6-275296 | 9/1994 |
| JP | 8-130805 | 5/1996 |
| JP | 8-214452 | 8/1996 |
| JP | 08214452 A * | 8/1996 |
| JP | 9-7618 | 1/1997 |
| JP | 10-326625 | 12/1998 |
| JP | 10-040962 | 10/1999 |

OTHER PUBLICATIONS

European Search Report for Application No. 01127254.9-2119, dated Apr. 4, 2006.

* cited by examiner

*Primary Examiner*—Patrick Ryan
*Assistant Examiner*—Keith Walker
(74) *Attorney, Agent, or Firm*—Lahive & Cockfield, LLP; Anthony A. Laurentano

(57) ABSTRACT

The present invention provides a highly efficient fuel cell power supply unit, which is constructed by directly connecting a fuel cell with a capacitor. In this power supply unit, a control device of the unit calculates the output voltage $V_2$ of the fuel cell after the variation of electrical load based on the synthetic current-voltage characteristics of the fuel cell and the capacitor and the predetermined width of the variation of electrical load $\Delta I$, calculates the corresponding current $Ifc_2'$, and then calculates the equilibrium reacting gas supply amount $Qa_1$, and supplies an excess amount of the reacting gas exceeding $Qa_1$ before the variation of electrical load.

1 Claim, 13 Drawing Sheets

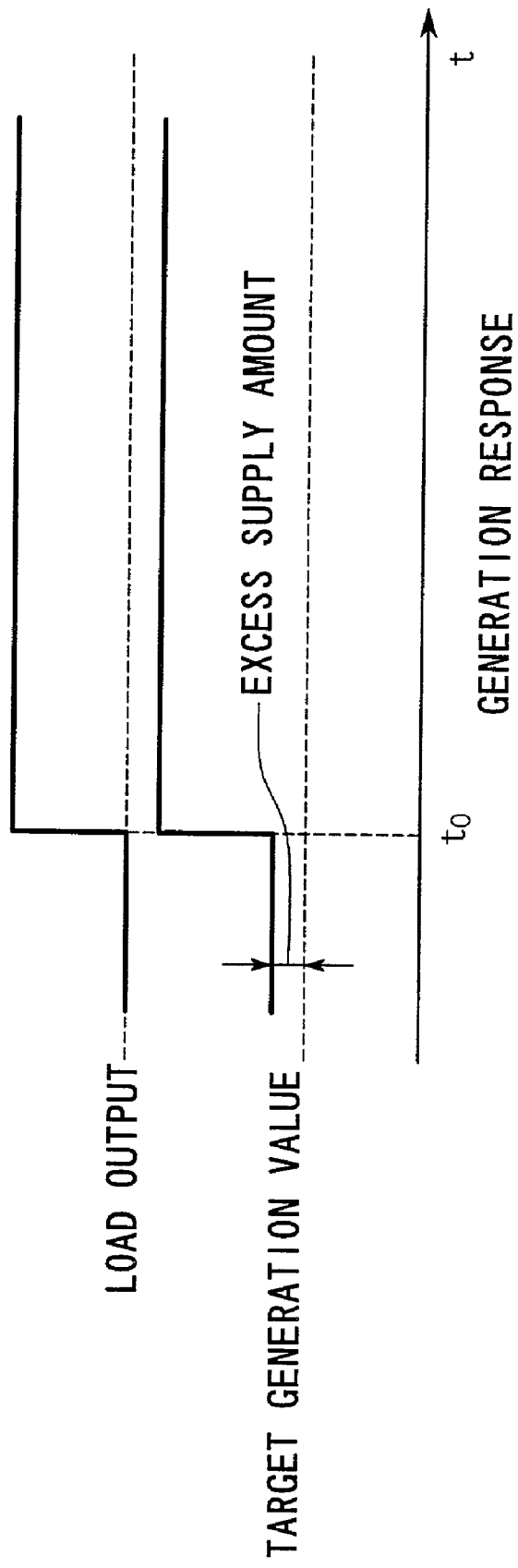

FUEL CELL POWER CONTROL UNIT

BACKGROUND OF THE INVENTION

1. Field of the Invention

The present invention relates to a power supply unit, which is constituted by directly connecting a fuel cell with an electric double layer capacitor

1. Description of the Related Art

Conventionally, a hybrid-type power supply unit, constituted by combining an electrochemical fuel cell (hereinafter, called a "fuel cell") and an electric double layer capacitor (hereinafter, called a "capacitor"), has been known as a hybrid power source for driving an electric vehicle.

The hybrid-type power supply unit is capable of supplying power for a traction motor of an electric vehicle in a stable manner by compensating for the power deficiency of the fuel cell caused by the slow response of the fuel cell at the time of transitional variation of the load with energy stored in the capacitor.

As described above, since the response of the fuel cell for the transitional variation of the load is slow, the fuel cell, even combined with a capacitor, is unable to supply sufficient energy for the sudden variation of the load, which results in entering into, what is called, the "gas-shortage state".

Accordingly, as a conventional measure to prevent a power deficiency, a DC/DC converter, provided between a fuel cell and a capacitor, is provided in order to control the output of the fuel cell. The DC/DC converter is used for controlling the output of the fuel cell so as not to exceed the output corresponding to an amount of reacting gas (including air and fuel gas) supplied to the fuel cell.

However, the DC/DC converter as an output control device controls the output of the fuel cell by a high speed switching (ON/OFF operation) of the switching element provided in the control device, and a problem arises in that the power loss due to the high speed switching operation becomes inevitably high.

In addition, in order to cope with a high output current of the fuel cell, the above output control device is designed to have a high current capacity, which causes a problem in that the control device must be large occupying a large amount of space in an electric vehicle.

SUMMARY OF THE INVENTION

The present invention was made to solve the above problems, and the present invention provides a power supply unit which exhibits a very high power efficiency by using a fuel cell by substantially directly connecting with a capacitor.

The present invention provides a fuel cell power supply unit (fuel cell power supply unit 10) comprising a fuel cell (for example, fuel cell 1) and a capacitor (capacitor 2), both of which are connected in parallel, the fuel cell power supply unit uses an excessive amount of a reacting gas supplied to the fuel cell at an output state (the output current Ifc=$I_1$ in FIG. 10A) by determining a voltage ($V_2$ in FIG. 10B) of the fuel cell after the variation of electrical load based on a synthetic output characteristics (the characteristic line shown by the dotted line in FIG. 10A) of the fuel cell and the capacitor, originated from a equilibrium point (equilibrium point U in FIG. 10A) on a current-voltage characteristics (characteristic line shown by the solid line in FIG. 10A) of the fuel cell at a predetermined output state and a predetermined width of a variation of electrical load ($\Delta I$ shown in FIG. 10A), determining a current ($Ifc_2'$ in FIG. 10A) corresponding to the voltage, obtaining a reacting gas supply amount ($Qa_1$ in FIG. 10B) corresponding to the current, and supplying the reacting gas at an amount which exceeds the equilibrium reacting gas supply amount (the output current Ifc=$I_1$) before the variation of electrical load.

According to the above constitution, since an increased amount of the reacting gas is supplied to the fuel cell in advance of the variation of electrical load, it is possible to prevent the fuel cell from entering into a gas-shortage state.

The above setting method makes it possible to obtain an excess supply amount which is the minimum necessary amount to be supplied to the fuel cell before the variation of electrical load, which avoids supplying excess gas and to provides efficient supply of the reacting gas.

In the above fuel cell power supply unit, the reacting gas amount supplied to the fuel cell at the output state is determined based on the current-voltage characteristics of said fuel cell (current-voltage characteristic lines shown by solid lines in FIGS. 10A and 11A), the current-voltage characteristics of the capacitor (one element for obtaining the synthetic current-voltage characteristics shown by the dotted line in FIG. 10A), and the equilibrium reacting gas supply amount characteristics (reacting gas supply amount characteristic curve at the equilibrium state shown by the solid line in FIG. 10B) corresponding to the current-voltage characteristics of the fuel cell.

The excess amount of the reacting gas supplied to the fuel cell at the equilibrium output state, the minimum necessary amount of the reacting gas supply amount after the variation of electrical load, can be accurately obtained.

In the above fuel cell power supply unit, the current-voltage characteristics of the fuel cell depend on an internal resistance of the fuel cell or an average internal resistance of the fuel cell within a predetermined output current range.

Since the current-voltage characteristics of the fuel cell depend on the internal resistance of the fuel cell, the necessary amount of the reacting gas at a predetermined output state differs by the internal resistance of the fuel cell. The accurate setting of the reacting gas supply amount based on the properties of the fuel cell enables avoiding the gas shortage state of the fuel cell and enables supplying an optimum amount of the reacting gas.

In the above fuel cell power supply unit, the current-voltage characteristics of the electric double layer capacitor depend on the internal resistance of the electric double layer capacitor.

Since the current-voltage characteristics of the capacitor depends on the internal resistance of the capacitor, the necessary amount of the reacting gas at a predetermined output state differs by the internal resistance of the capacitor. The accurate setting of the reacting gas supply amount based on the properties of the capacitor enables avoiding the gas-shortage state of the fuel cell and enables supplying an optimum amount of the reacting gas.

In the above fuel cell power supply unit, the reacting gas amount supplied from the reacting gas supply system (the fuel cell 1 and peripheral auxiliary electric machines such as the compressor 11, heat exchanger 13, high-pressure hydrogen tank 18, electric-operated shutoff valve 19, a regulator 17, ejector 20, demister 21, and a humidifier 15) to the fuel cell is determined such that the response time (the period from T0 to T3 in FIG. 9) reaching from the reacting gas amount at the predetermined output state (a reacting gas supply amount equilibrated with the rotation speed $Nm_1$ of the compressor 11) to the equilibrium reacting gas amount after the variation of electrical load (a reacting gas supply amount equilibrated with the rotation speed $Nm_2$ shown in FIG. 9) is shorter than the output assistance operation period (the period from T0 to T5 in FIG. 9) by the electric double layer capacitor. As shown above, since the minimum necessary amount of the reacting gas is supplied to the fuel cell during the output assisting operation time by the capacitor, the gas shortage state of the fuel cell can be eliminated.

In the above fuel cell power supply unit, the response time (the pump response characteristics COMP shown in FIG. 9) of said reacting gas supply system is set below the output assistance period of the electric double layer capacitor.

Accordingly, the response time characteristics of the reacting gas supply system is determined as described above, and the output of the fuel cell can be converted into the equilibrium state after the variation of electrical load within the output assisting operation period by the capacitor.

In the above fuel cell power supply unit, a capacitance of the electric double layer capacitor is determined such that the response time of said reacting gas supply system is set below the output assistance period by the output assistance operation period of the electric double layer capacitor.

By determining the capacitance of the capacitor as described above, the minimum necessary amount of the reacting gas is supplied for outputting the output power after the variation of electrical load, and the fuel cell can be prevented from entering the gas-shortage state.

In a fuel cell power supply unit, whose reacting gas supply amount to be supplied to the fuel cell is determined based on a target generation command value, while calculating the target output command value for driving the motor and the target generation command value for the fuel cell at a predetermined interval based on the input signals indicating the driving state of the vehicle, since a width of the variation of electrical load (the difference between two generation command values) obtained based on two sequentially obtained target generation command quantities (the newest generation command value and the previous generation command value) is controlled so as to be lower than the predetermined variation of electrical load width (for example, the variation of electrical load width ΔI).

Thus, it is possible to prevent the fuel cell from entering the gas-shortage state by controlling so as not to require excessive output power which will resulted in the shortage state of the reacting gas for the fuel cell.

According to the fuel cell power supply unit of the present invention, a current limiting device (for example, as shown in the embodiment a current limiting device comprising a chopper-type DC/DC converter) provided between the fuel cell and the capacitor functions for charging the capacitor (when the current limiting device is a chopper-type DC/DC converter, the switching device in the converter works switching operations) at the time of starting the vehicle, whereas the fuel cell and the capacitor are varied to a directly connected state when the potential difference between the fuel cell and the capacitor is reduced to be lower than a predetermined potential difference (for example, the fuel cell does not enter into the gas-shortage state).

Since the fuel cell and the capacitor can be substantially directly connected as described above, it is possible to avoid power loss by the switching operation in the current limiting device, and it is also possible to supply the power to the load effectively.

BRIEF DESCRIPTION OF THE DRAWINGS

FIG. 8 is a diagram showing various output characteristics of the fuel cell power supply unit according to one embodiment of the present invention.

DETAILED DESCRIPTION OF THE INVENTION

Hereinafter, one embodiment of the present invention will be explained with reference to the drawings.

Figure 4:
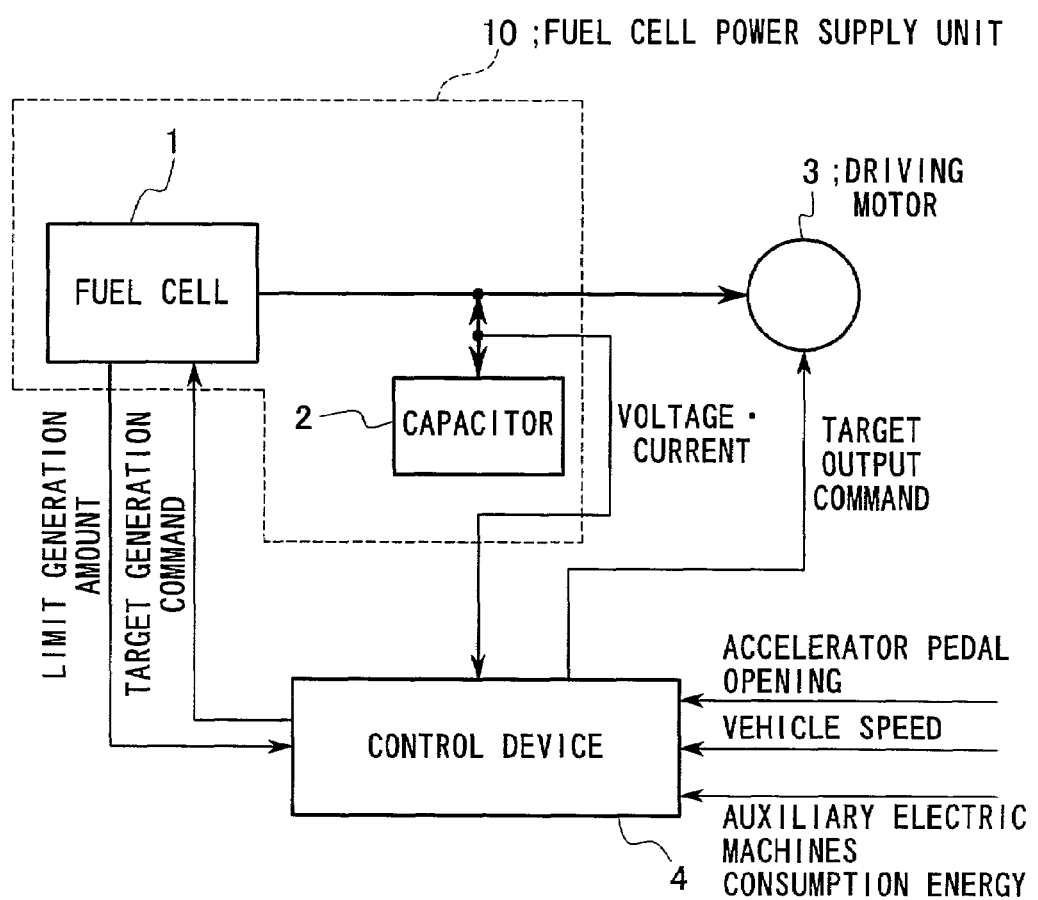
FIG. 4 is a diagram showing a schematic diagram of an electric vehicle provided with a fuel cell power supply unit according to one embodiment of the present invention.

FIG. 4 is a diagram showing a schematic diagram of an electric vehicle provided with a fuel cell power supply unit 10 according to one embodiment of the present invention.

The fuel cell power supply unit 10 according to one embodiment of the present invention is installed in a vehicle and functions as a power supply for driving the vehicle. The fuel cell power supply unit 10 is a hybrid-type power supply unit comprised of a fuel cell 1 and an electric double layer capacitor (hereinafter, simply called a capacitor) 2 both of which are connected in parallel. The fuel cell power supply unit 10 supplies power to a traction motor 3 and the power of the traction motor 3 supplied from the fuel cell power supply unit 10 is transmitted to driving wheels through a reduction or a transmission T/M (not shown).

In the deceleration mode of the fuel cell vehicle provided with the fuel cell power supply unit 10 according to one embodiment of this invention, when the driving force is transmitted from the driving wheel to the traction motor 3, the traction motor 3 functions as a generator and generates regenerative braking power for recovering the kinetic energy of the vehicle as electrical energy. The traction motor 3 is a permanent magnet-type three phase alternating current synchronous motor which utilizes a permanent magnet for magnetic field and the traction motor 3 is driven by the three-phase alternating current.

The fuel cell 1 is composed of a stack of a plurality of cells, each of which is formed by inserting a polymer electrolyte membrane formed by an ion exchange film and the like between an anode and a cathode, and the fuel cell 1 is provided with a hydrogen electrode to which hydrogen is supplied and an oxygen electrode to which air containing oxygen as an oxidizing agent is supplied. The power generation of the fuel cell 1 is carried out as follows. That is, hydrogen ions produced by a catalytic reaction at the anode are transmitted to the cathode through a polymer electrolyte membrane and the electrical power is generated by an electrochemical reaction taking place between hydrogen ions with oxygen at the cathode.

The capacitor 2 used for the fuel cell power supply unit 10 is, for example, an electric double layer capacitor.

A control device 4 is constituted as a logic circuit including a microcomputer as a main component and the control device 4 comprises a CPU, ROMs, RAMs, and input and output ports (components are not shown). The CPU executes prescribed calculation processes in accordance with predetermined control programs. The ROMs stored in advance control programs and control data which are required for carrying out a variety of calculation processes by the CPU, and the RAMs are used for reading and writing all types of data which are necessary for executing various calculation processes. The input and output ports receives signals detected by various sensors, such as a remaining charge monitoring device, and outputs signals to predetermined portions for controlling driving states of the fuel cell power supply unit 10 and every component of the fuel cell vehicle.

For example, the control device 4 calculates a target generation amount based on signal inputs as parameters such as an accelerator pedal opening signal concerning depression operation of the accelerator pedal by a driver, signals of the vehicle speed and a rotation n speed of the motor, and signals of sensors associated with energy consumption of electrical auxiliary devices. The target generation amount obtained as described above is transmitted to the fuel cell power supply unit 10 as well as to the traction motor 3. The remaining charge of the capacitor 2 is calculated based on signals from sensors such as a voltage sensor or a current sensor (not shown), and the remaining charge of the capacitor is used as one of the parameters for controlling the fuel cell power supply unit 10.

In order to drive the fuel cell power supply unit 10 according to the one embodiment of the present invention, various components are used in addition to the above-described constituting elements such as an inverter for converting the direct current supplied from the fuel cell power supply unit 10 to three phase alternative current and supplying the three-phase alternating currents, sensors for detecting voltage, current, and temperatures of the fuel cell power supply unit 10, and switching elements for switching based on signals input from the control device 4. Explanations of these constituting elements will be described later.

Figure 5:
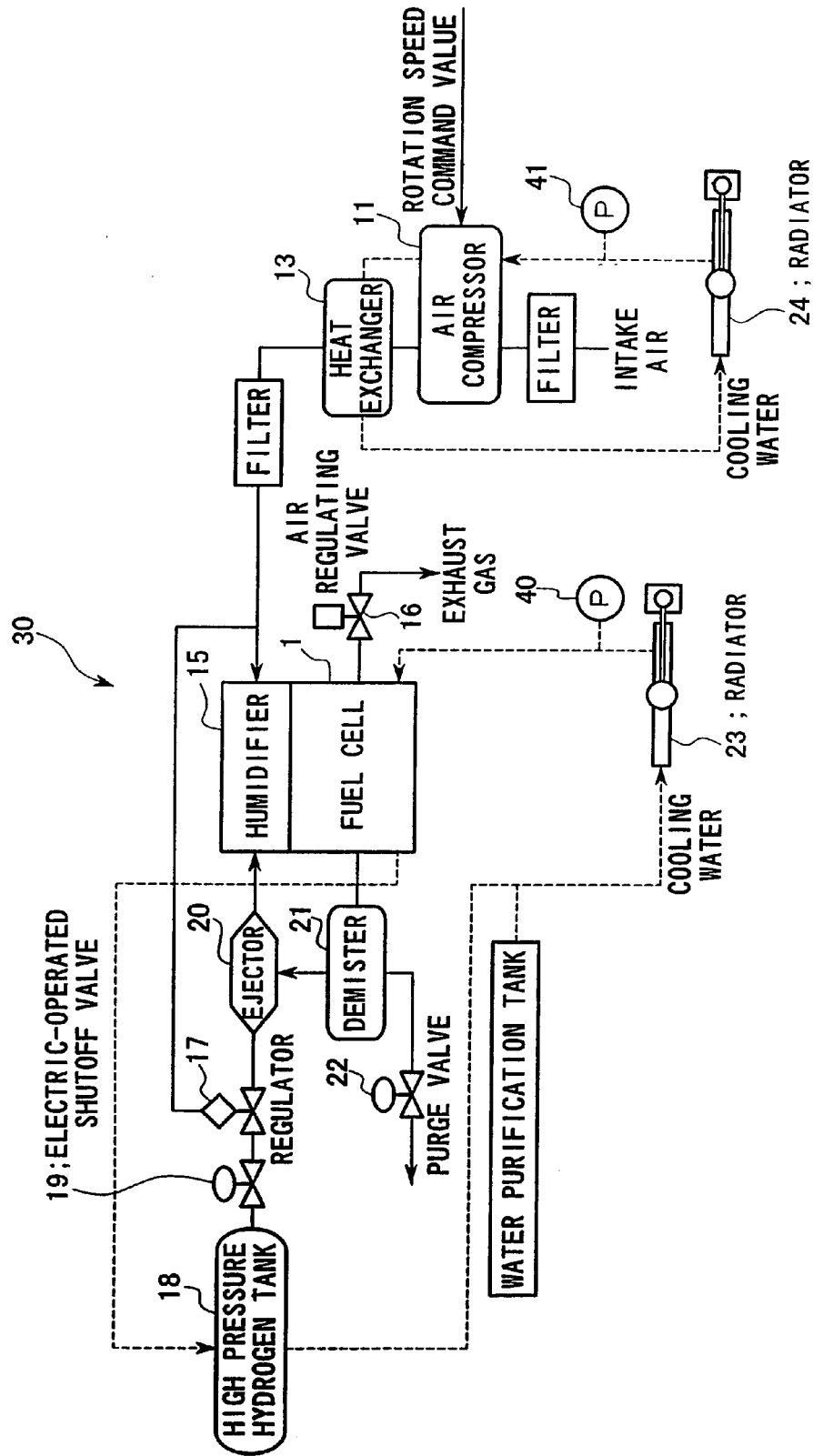
FIG. 5 is a diagram showing the fuel cell according to one embodiment and its peripheral devices.

Although not shown in the block diagram of FIG. 4, the fuel cell 1 is required to provide peripheral devices in addition to the fuel cell body composed of the cell stack structure for executing power generation by the fuel cell 1. FIG. 5 is a block diagram showing the structure of a fuel cell system 30 composed of the fuel cell 1 and the peripheral devices.

As shown in FIG. 5, an air compressor 11 connected to the oxygen electrode side of the fuel cell 1 supplies air not only to the oxygen electrode but also to the regulator 17 as a signal pressure. Thus, a rotation speed command value N is input from the control device 4 to the motor (not shown) which is used for driving the air compressor 11. The motor drives the air compressor 11 based on the rotation speed command value N and the air compressor thereby compresses externally introduced air for supplying to a heat exchanger 13. The compressed air is cooled by the heat exchanger 13 and dust is removed by a filter.

Air, after dust is removed, is supplied to a humidifier 15, and the humidified air supplied to the fuel cell 1 is used for the above-described electrochemical reaction. After this, air is exhausted from the fuel cell after passing through a pressure regulating valve 16 provided for regulating the pressure drop of the air to path through the fuel cell 1.

A regulator 17 (called a proportional pressure regulator) regulates the pressure of hydrogen supplied from a high pressure hydrogen tank 18 to the fuel cell 1 based on the air pressure (pilot signal) supplied from the air supply side. As described above, the air pressure and the hydrogen pressure to be supplied from the air supply side and the hydrogen supply side are controlled by a regulator 17 so as to be balanced.

Since the pressure of hydrogen supplied from the high pressure hydrogen tank 18 is high, the pressure of hydrogen is reduced by a regulator 17 after being firstly reduced by an electric-operated shutoff valve 19 and hydrogen after the pressure reduction is supplied to a humidifier 15 through an ejector 20. After humidifying by the humidifier 15, hydrogen is supplied to the fuel electrode of the fuel cell 1. After being used for the electrochemical reaction, hydrogen is discharged from the fuel cell 1 to a demister 21. The discharged gas supplied into the demister 21 is subjected to gas-liquid separation and hydrogen in the gas phase state is circulated to the supply side of hydrogen through an ejector 20 to be reused.

A purge valve 22 is provided at the exhaust side of hydrogen for discharging water held in the fuel cell and the demister.

Note that the above-described electric-operated shutoff valve 19 also has a function to cutoff the hydrogen supply from the high pressure hydrogen tank 18.

Water pumps 40 and 41 are used for circulating cooling water after being cooled by heat dissipation in radiators 23 and 24 in the auxiliary devices/control devices for controlling the temperature of the auxiliary devices/control devices below a predetermined temperature. In the present system, the water pump 40 is provided for cooling the fuel cell 1, the auxiliary devices/control devices and for heating the fuel supply side, and the water pump 41 is provided for cooling the air supply devices.

The auxiliary devices/control devices output a driving signal for the air regulator 16 and the electric power generation output of the fuel cell is controlled by opening or closing the air supply to the fuel cell 1 or by regulating the amount of air supply to the fuel cell 1.

Explanation about the constitution of the fuel cell power supply unit 10 is provided as described above. Next, the variation of the reacting gas amount to be supplied to the fuel cell 1 is described below when the fuel cell power supply unit 10 must respond to a specific variation of electrical load.

Figure 6:
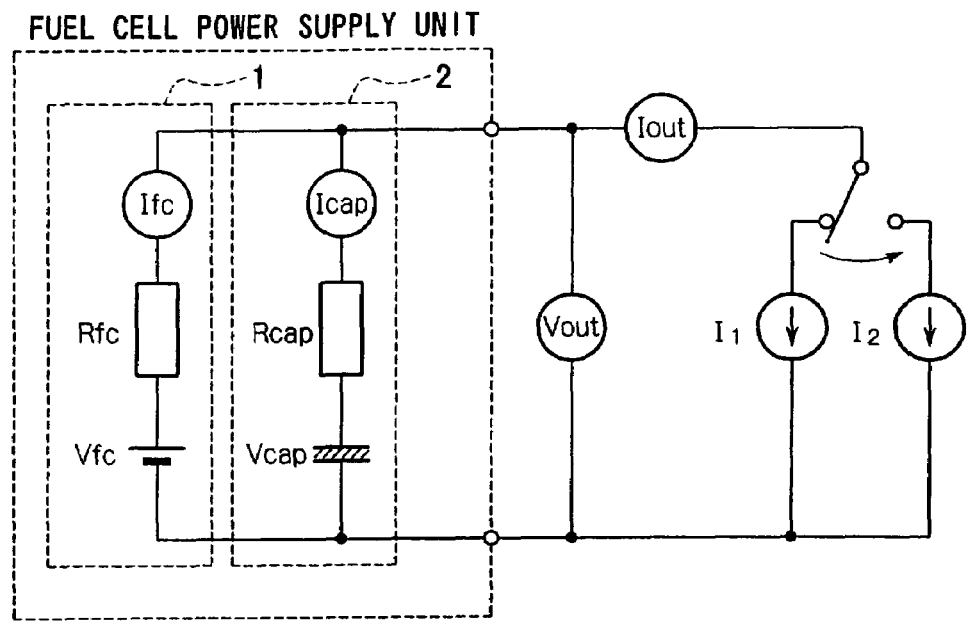
FIG. 6 is a diagram showing an equivalent circuit of the fuel cell power supply unit according to one embodiment of the present invention.

FIG. 6 is a diagram showing an equivalent circuit of the fuel cell power supply unit 10 according to one embodiment of the present invention. In FIG. 6, Vfc denotes a electromotive force of the fuel cell, Rfc denotes an internal resistance of the fuel cell, and Ifc denotes a current flowing in the fuel cell. In the capacitor 2 block, Vcap denotes a charge voltage, Rcap denotes an internal resistance, and Icap denotes a capacitor current. Vout denotes an output voltage of the fuel cell power supply unit 10 and Iout denotes a current flowing in the fuel cell power supply unit 10.

In the fuel cell power supply unit 10 shown by the above-described equivalent circuit, an operation is described below when the electrical load varies.

For the convenience of explanation, a case will be described in which the load current varies stepwise from $I_1$ to $I_2$. Note that the electrical load will not vary stepwise as for actual vehicles.

When such a load current takes place, the control device 4 requires of the fuel cell power supply unit 10 to output power corresponding to the variation of electrical load, that is, an output corresponding to the load current $I_2$. However, as shown in FIG. 5, the output corresponding to the variation of electrical load is not generated until the control device 4 transmits a rotation speed command value to the motor for driving the air compressor as the auxiliary device, the rotation speed of the compressor increases, the reacting gas supply increases, and the electrochemical reaction takes place in the fuel cell 1. Thus, it takes time for the fuel cell to generate electric power corresponding to the variation of electrical load.

Accordingly, during the delayed period of the fuel cell for responding to the variation of electrical load, the capacitor 2 connected in parallel to the fuel cell 1 can supply a necessary amount of electric power to the traction motor 3 for responding to the variation of electrical load.

However, as shown in FIG. 6, because of the internal resistance Rcap of the capacitor, a voltage drop will be generated due to the increased current by supplying electric power.

Figure 7A:
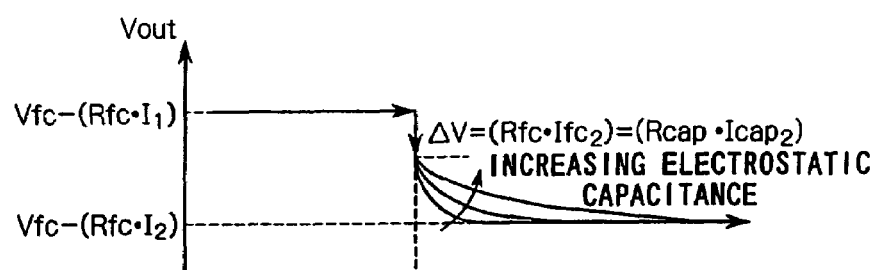
FIGS. 7A and 7B are diagrams showing the voltage response characteristics and current response characteristics of the fuel cell power supply unit according to one embodiment of the present invention.
Figure 7B:
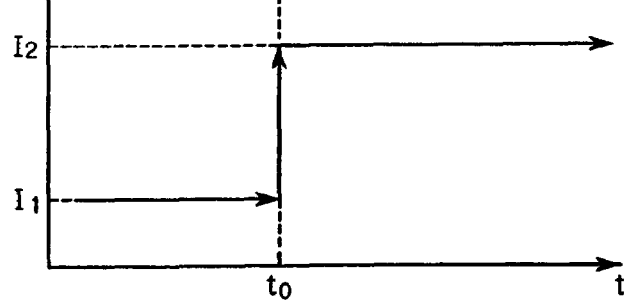

FIGS. 7A and 7B show a time dependent variation of the output voltage Vout (response characteristics) of the fuel cell power supply unit 10 when the load current Iout varies stepwise from $I_1$ to $I_2$. FIG. 7A shows the response characteristics of the output voltage and FIG. 7B shows the response characteristics of the load current.

As shown in FIGS. 7A and 7B, before the variation of electrical load, the voltage of the fuel cell power supply unit 10 is at an equivalent voltage of Vout=Vfc−(Rfc_$I_1$).

When the electrical load varies at time $T_0$, the capacitor starts supplying the electric power corresponding to the variation of electrical load. However, the supplying of the electric power caused rapid increase of the capacitor current Icap and the increased capacitor current Icap originates a voltage drop ($\Delta V$=Rfc_$Ifc_2$=Rfc_$Icap_2$). Thereafter, the output voltage Vout gradually decreases due to the discharge of the capacitor 2, and the output voltage Vout reaches a equilibrium state when the output voltage becomes Vout=Vfc−(Rfc_$I_2$). Accordingly, the time required to converge to the equilibrium state of Vout=Vfc−(Rfc_$I_2$) becomes longer when the capacitance of the capacitor 2 is larger. The voltage drop immediately after the variation of electrical load is smaller when the internal resistance of the capacitor 2 is smaller.

When the voltage drop takes place immediately after the variation of electrical load, that is, when the output voltage drops when the fuel cell is responding to the variation of electrical load, the reacting gas for the fuel cell 1 becomes shortage, that is, the fuel cell falls into the gas shortage state.

When such a gas shortage state continues or when the gas shortage state occurs frequently, the water content of the polymer electrolyte membrane, made of an ion exchange membrane, becomes shortage, and the resistance for hydrogen ions to pass through the polymer membrane becomes high, which deteriorates the polymer membrane and also shortens the service life of the polymer membrane.

In order to prevent such a gas shortage state, it is necessary to supply the fuel cell 1 in advance with an excess amount of reacting gas corresponding to the voltage drop due to the internal resistance.

This oversupply amount is determined by the internal resistance and the capacitance of the capacitor which constitutes the fuel cell power supply unit 10, a prescribed width of the variation of electrical load, and characteristic values of the fuel cell 1 and the fuel cell system 30.

Examples of the above-described characteristic values of the fuel cell include the output voltage and the internal resistance of the fuel cell 1 derived from the equation concerning the current-voltage characteristics (Vout=Vfc−(Rfc_Ifc)), and an example of the characteristic value of the fuel cell system 30 includes the response speed of the reacting gas supply system to the fuel cell, which will be described later.

Below, a method of setting the oversupply amount is described with reference to FIGS. 1 to 3.

A method of setting the oversupply amount in the case in which the internal resistance Rcap of the capacitor 2 is higher than that of the internal resistance Rfc of the fuel cell 1 is described with reference to FIG. 1.

Figure 1:
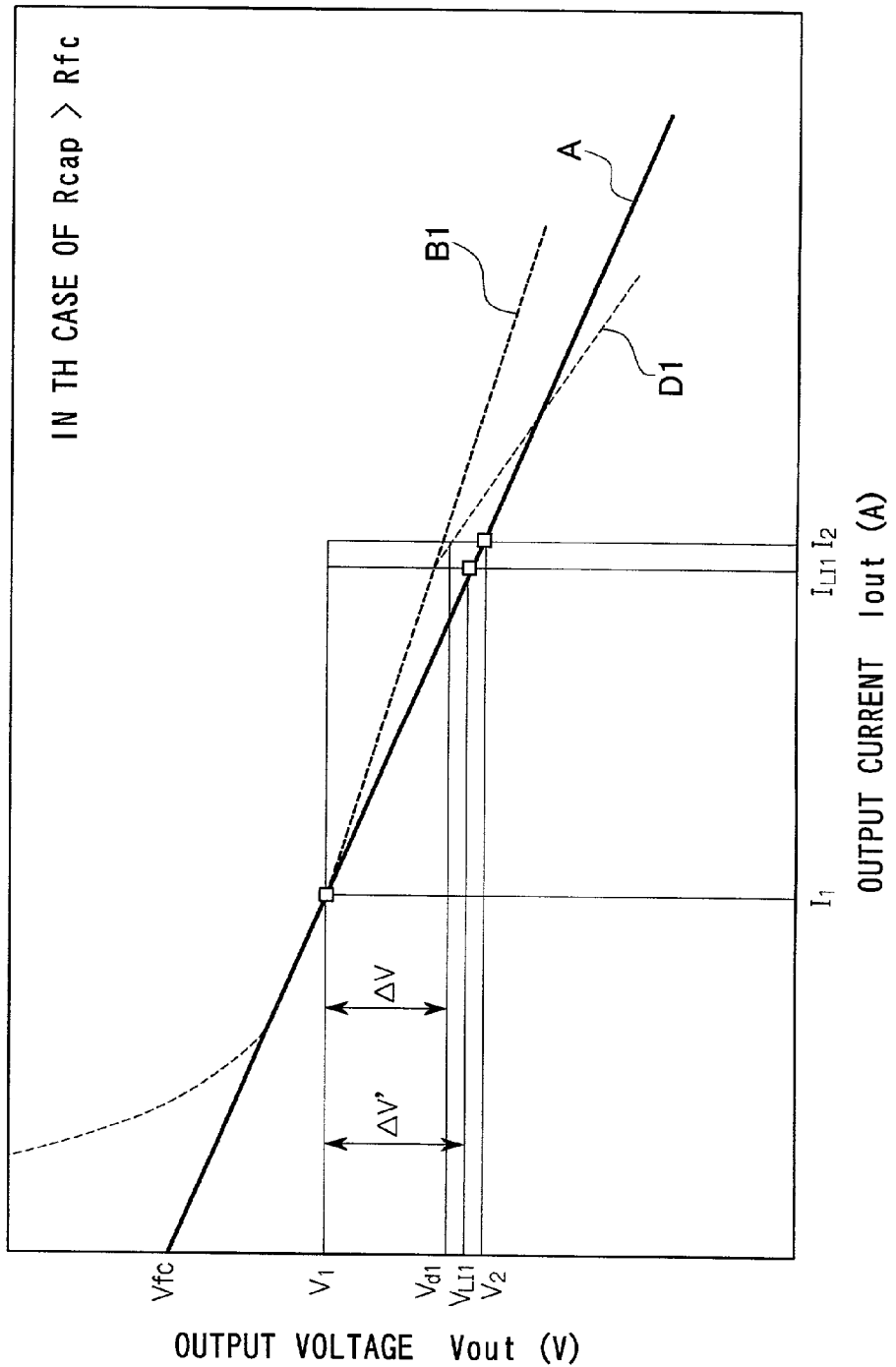
FIG. 1 is a diagram showing a example of the current-voltage characteristics of a fuel cell according to one embodiment of the present invention.

In FIG. 1, as shown by the line A which shows the current-voltage characteristic line of the fuel cell 1, a higher output voltage is obtained when the output current is low and the output voltage decreases as the output voltage increases. When the output voltage and the output current are below the line A, the fuel cell is assumed to be in the gas shortage state.

The line B1 in FIG. 1 shows a current-voltage characteristic line of the fuel cell power supply unit 10 when the maximum amount of the reacting gas is set and supplied to the fuel cell 1 prior to the variation of electrical load.

Next, response characteristics of the fuel cell power supply unit 10 provided with a fuel cell 1 having the current-voltage characteristics shown above is described below when the load current varies by stepwise from $I_1$ to $I_2$.

Assume for example, that the excess supply amount of the reacting gas to the fuel cell is set at an amount which is capable of outputting a current $I_{Ln}$ ($I_1<I_{Ln}<I_2$), that is, when the supply amount of the reacting gas makes the fuel cell reach an equilibrium output current $I_{Ln}$. This supply amount of the reacting gas corresponds to the oversupply amount capable of outputting the current of $I_{Ln}-I_1$.

In the above case, the output power of the fuel cell is not sufficient to respond to the variation of electrical load, so the capacitor 2 assists the output power as the fuel cell power supply unit 10. That is, the output power of the fuel cell power supply unit 10 is dependent on the output of the capacitor until the fuel cell 1 can supply the output power corresponding to the variation of electrical load, which corresponds to the transition time of the fuel cell for responding to the variation of electrical load.

As a result, when the output current is in a region ranging from $I_1$ to $I_{Ln}$, the current-voltage characteristics of the fuel cell power supply unit 10 varies along the line B1 in FIG. 1, while when the output current is beyond $I_{Ln}$, the fuel cell power supply unit 10 shows the current-voltage characteristics of the capacitor as shown by the line D1. Note the current-voltage characteristics of the capacitor shown by the line Dl is expressed by, Vout=Vcap−(Icap_Rcap), wherein Rcap>Rfc and Vcap is constant.

The output voltage of the fuel cell power supply unit 10 at an output current $I_2$ immediately after the variation of electrical load can be obtained as $V_{d1}$ from the line D1, and the voltage drop $\Delta V$ of the fuel cell power supply unit 10 when the variation of electrical load is applied in a stepwise manner can be obtained as the voltage by subtracting the output voltage $V_{d1}$ at $I_2$ from the output voltage $V_1$ at $I_1$.

Since it is possible for the fuel cell 1 to output an output voltage which corresponds to an output current, equilibrated with the amount of the reacting gas supplied before the variation of electrical load, the output voltage is obtained as $V_{LI1}$ from the line A. Thus, an allowable voltage drop $\Delta V'$ for the fuel cell 1 immediately after the variation of electrical load is obtained by subtracting the output voltage $V_{LI1}$ at $I_{LI1}$ from the output voltage $V_1$ at $I_1$, as shown in FIG. 1.

Accordingly, since the allowable voltage drop $\Delta V'$, which is estimated from the amount of reacting gas supplied to the fuel cell 1 before the variation of electrical load, is larger than the voltage drop $\Delta V$ immediately after the variation of electrical load, it is possible to prevent the fuel cell from entering into the gas shortage state.

As described above, it becomes possible to prevent the fuel cell from entering into the gas shortage state by setting an excess supply amount of the reacting gas so as to exceed the equilibrated supply amount before the variation of electrical load to be able to generate an output voltage above the voltage $V_{LI1}$, which corresponds to the output voltage of the fuel cell 1 equilibrated with the supply amount of the reacting gas before the variation of electrical load.

Figure 2:
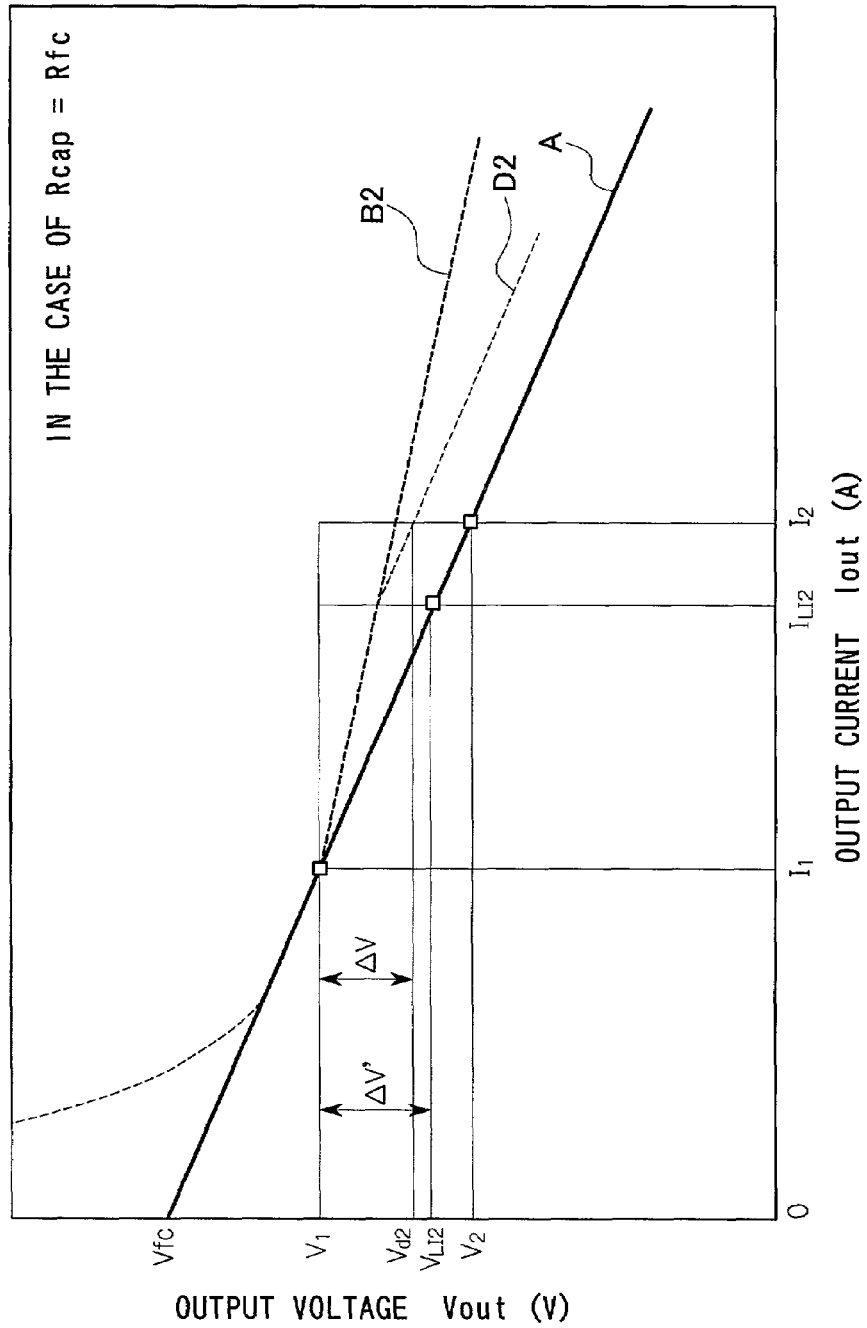
FIG. 2 is a diagram showing another example of the current-voltage characteristics of a fuel cell according to one embodiment of the present invention.

Next, a consideration is described when the internal resistance Rcap of the capacitor 2 is equal to the internal resistance Rfc of the fuel cell with reference to FIG. 2.

The line A in FIG. 2 is the same current-voltage characteristic line of the fuel cell 1 as that shown in FIG. 1.

The line B2 in FIG. 2 shows a current-voltage characteristic curve of the fuel cell power supply unit 10 when the maximum amount of the reacting gas is set and is supplied to the fuel cell 1 prior to the variation of electrical load. As shown, a gradient of the current-voltage characteristic line B2 is more gentle than that of the characteristic line B1, since the internal resistance Rcap of the capacitor 2 is equal to the internal resistance Rfc of the fuel cell.

A response characteristics of the fuel cell power supply unit 10 is described below when the load current is varied stepwise from $I_1$ to $I_2$.

Assume, for example, that the excess supply amount of the reacting gas to the fuel cell is set at an amount which is capable of outputting a current $I_{LI2}$ ($I_1 < I_{LI2} < I_2$), that is, when the supply amount of the reacting gas makes the fuel cell reach an equilibrium output current $I_{LI2}$, the output power of the fuel cell is not sufficient so as to respond to the variation of electrical load so that the capacitor 2 assists the output power as the fuel cell power supply unit 10. Note that the excess supply amount corresponds to the amount of the reacting gas which enable to output the current $I_{LI2} - I_1$.

Thus, when the output current I is a region ranging from $I_1$ to $I_{LI2}$, the current-voltage characteristics of the fuel cell power supply unit 10 is modified to the synthetic current-voltage characteristics composed of both characteristics of the fuel cell 1 and capacitor 2, which is shown by line B2 in FIG. 2. In contrast, when the output current is in a region above $I_{IL2}$, the output voltage of the fuel cell power supply unit 10 is represented by the current-voltage characteristics of the capacitor, that is, as shown by line D2 in FIG. 2.

The current-voltage characteristic line of the capacitor 2 is linear as shown by the Line C2, following the equation of Vout=(Icap_Rcap), wherein the Reap is constant. In addition, since Rcap=Rfc, the gradient of the line D2 is identical with that of the current-voltage characteristic line A.

The output voltage of the fuel cell power supply unit 10 at a current $I_2$ is obtained as $V_{d2}$ from the line D2. Therefore, the voltage drop $\Delta V$ due to the internal resistance Rcap of the capacitor 2 when the load current varies stepwise from $I_1$ to $I_2$ can be obtained as shown in FIG. 2, as explained similarly for FIG. 1.

The output voltage corresponding to an output current which is in equilibrium with the amount of reacting gas supplied to the fuel cell 1 is obtained as $V_{LI2}$ from the line A, and it is estimated that the fuel cell 1 can output the output voltage to the extent of $V_{LI2}$. The allowable output voltage variation $\Delta V'$ for the fuel cell 1 when the load current varies from $I_1$ to $I_2$ is obtained as shown in FIG. 2.

As shown above, even if the voltage drop occurs due to the internal resistance of the capacitor 2 after the variation of electrical load, an excess amount of reacting gas is supplied in advance to the fuel cell 1 to cover the voltage drop, so that it is possible to prevent the fuel cell vehicle from entering into a gas shortage state.

Next, an explanation is provided below when the internal resistance of the capacitor Rcap is lower than the internal resistance of the fuel cell 1 with reference to FIG. 3.

Figure 3:
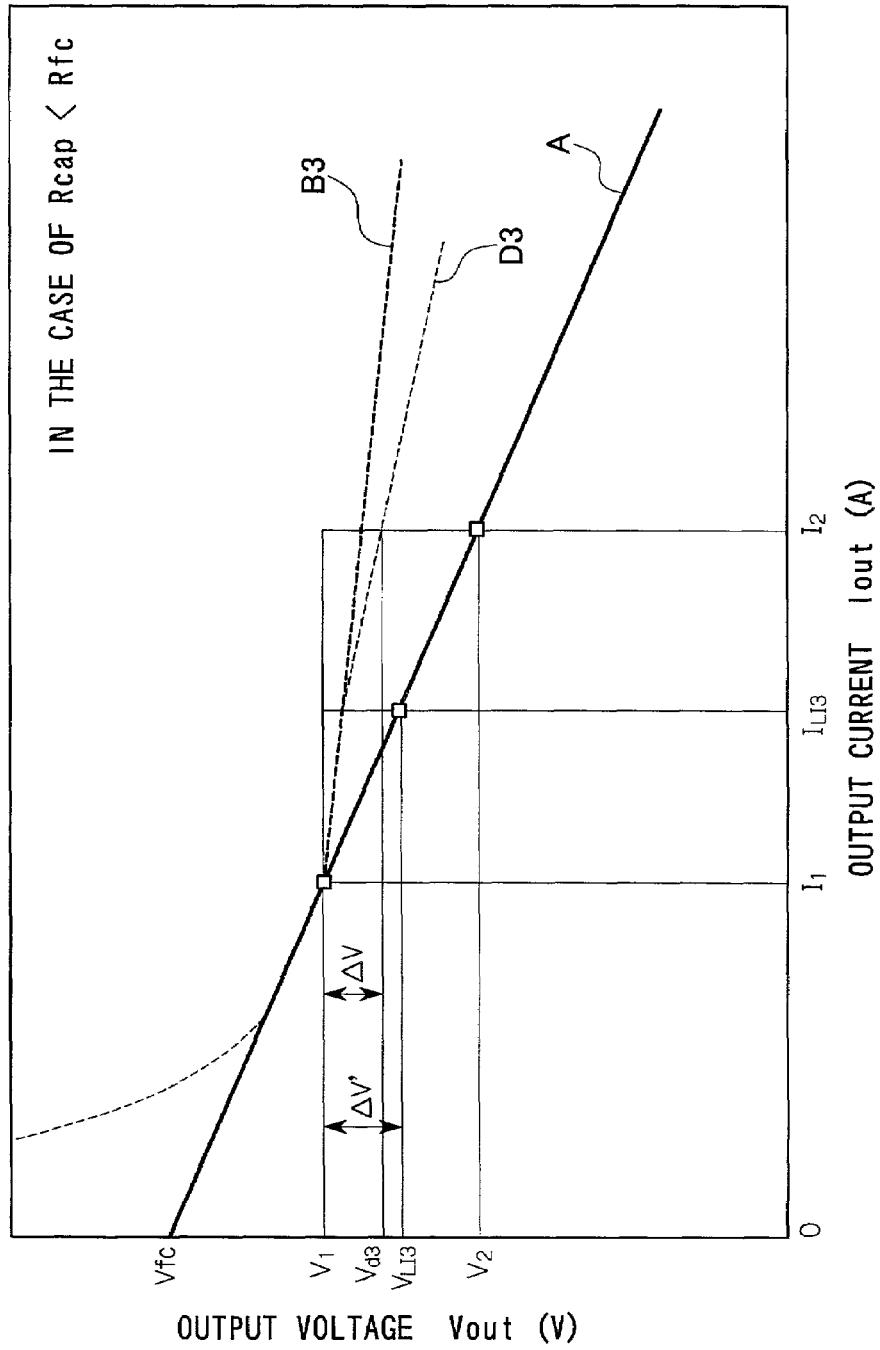
FIG. 3 is a diagram showing a schematic diagram of an electric vehicle which is provided with a fuel cell power supply unit according to one embodiment of the present invention.

The line A in FIG. 3 shows a current-voltage characteristic line of the fuel cell, similarly to FIG. 1.

In addition, the line B3 in FIG. 3 shows a current-voltage characteristic line of the fuel cell power supply unit 10 when the maximum amount of the reacting gas is set and is supplied to the fuel cell 1 prior to the variation of electrical load. Since the internal resistance Rcap of the capacitor 2 is lower than the internal resistance Rfc of the fuel cell 1, the gradient of the current-voltage characteristic line B3 becomes more gentle that that of the line B2.

The response characteristics of the fuel cell power supply unit 10 will be described when the load current varies stepwise from $I_1$ to $I_2$.

In the above case, when, for example, the excess supply amount to the fuel cell 1 is set to a value capable of outputting the output current $I_{LI3}$ ($I_1 < I_{LI3} < I_2$), that is, when the amount of the reacting gas is set to an amount capable of outputting an equilibrated current $I_{LI3}$, since the output power from the fuel cell 1 is not sufficient in a region higher than $I_{LI3}$, similarly in the case of FIG. 1, the output power is assisted by the capacitor 2. The excess supply amount of the reacting gas corresponds to that for outputting a power of $I_{LI3} - I_1$.

When the current is in a range from $I_1$ to $I_{LI3}$ the current-voltage characteristics of the fuel cell power supply unit 10 is thereby governed by the synthetic current-voltage characteristics of both fuel cell 1 and capacitor 2, and when the current is higher than $I_{LI3}$, the current-voltage characteristics of the fuel cell power supply unit 10 is governed by that of the capacitor 2, shown by line D3.

The current-voltage characteristics shown by line D3 is linear and is expressed by An equation, Vout=Vcap-(Icap_Rcap), wherein Vcap is constant. Sinve Rcap<Rfc, the line D3 show the most gentle gradient among current-voltage characteristic lines D1, D2 and D3, shown in FIG. 1 to FIG. 3.

The output voltage at a current $I_2$ of the fuel cell power supply unit 10 is obtained as $V_{d3}$ from the line D3. When the load current varies stepwise from $I_1$ to $I_2$, the voltage drop $\Delta V$ due to the internal resistance Rcap of the capacitor can be obtained as shown in FIG. 3, similarly shown in FIG. 1.

In contrast, the output voltage corresponding to an output current which is equilibrated with the amount of the reacting gas supplied to the fuel gas before the variation of electrical load is obtained as $V_{LI3}$ from the line A, the fuel cell 1 is capable of outputting the power until the output voltage of $V_{LI3}$. In addition, the allowable output variation $\Delta V'$ for the fuel cell 1 for the variation of electrical load from $I_1$ to $I_2$ is obtained as the value as shown $\Delta V'$ in FIG. 3. As a result, after the variation of electrical load, even if a voltage drop $\Delta V$ is generated due to the internal resistance Rcap of the capacitance, since the reacting gas is supplied in excess in advance for covering the voltage drop, it is possible to prevent the vehicle from entering into the gas shortage state.

Note that, in the cases shown in FIGS. 1 to 3, if the minimum value of excess reacting gas among the amounts adopted in the above cases is selected, it is possible to avoid supplying too much reacting gas and to consume the reacting gas efficiently.

As described above, it is possible to determine the amount of the reacting gas to be supplied to in excess for any situation as shown in FIGS. 1 to 3. It is also possible to determine the excess supply amount by the following procedure.

Figures 10A, 10B:
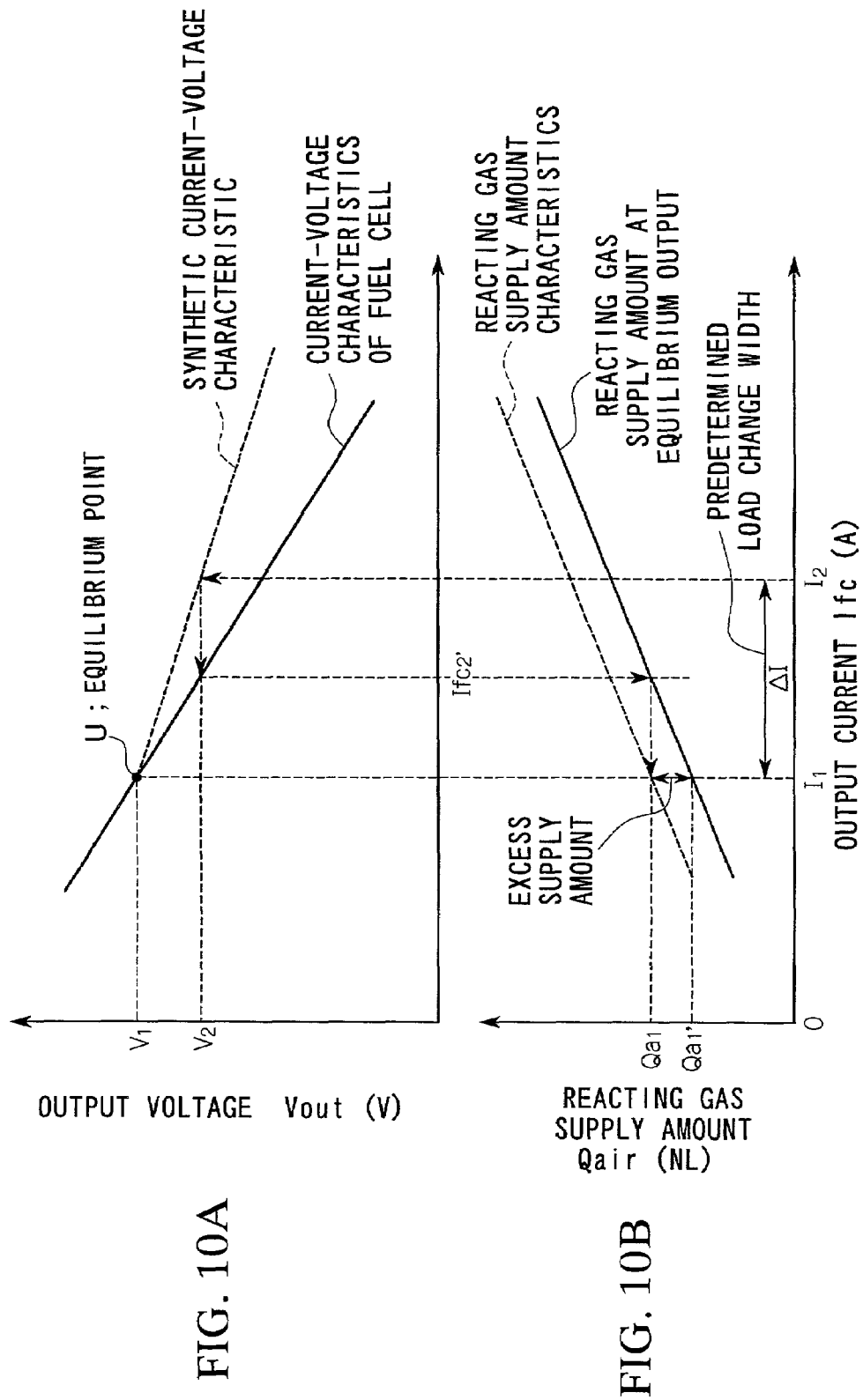
FIGS. 10A and 10B show portions of various characteristics curves explaining method of setting the excess supplying amount.

The solid line shown in FIG. 10A show a current-voltage characteristics of a fuel cell 1. The dotted line of FIG. 10A shows synthetic current-voltage characteristics and the starting point (the equilibrium point U) of the characteristics lines is an equilibrium point where the fuel cell 1 and the capacitor 2 are substantially coupled.

The solid line in FIG. 10B represent the relationship between the output current and the supply amount of the reacting gas to the fuel cell 1. As shown in FIG. 10B, the output current increases as the amount of the reacting gas supplied to the fuel cell 1 increases. The dotted line in FIG. 10B shows an output current dependency of the amount of the reacting gas including the excess amount to be supplied to the fuel cell (hereinafter, simply called the reacting gas supply amount characteristics) for preventing the fuel cell from entering into the gas shortage state due to the voltage drop generated by the current variation of electrical load. The reacting gas supply amount characteristics will be described later.

The current-voltage characteristics of the fuel cell shown in FIG. 10A is dependent on the amount of the reacting gas supplied to the fuel cell 1 shown in FIG. 10B. That is, when the current Ifc=$I_1$, the output voltage $V_1$ is obtained as a result of supplying the reacting gas in an amount $Qa_1'$. In other words, the solid line in FIG. 10B shows a minimum necessary amount of the reacting gas for obtaining the current-voltage characteristics of the fuel cell 1 shown by the solid line in FIG. 10A. Based on the relationship between the current-voltage characteristics and the amount of the reacting gas supplied to the fuel cell 1, the amount of the reacting gas supplied to the fuel cell 1 when the fuel cell is in the equilibrium state is called the equilibrium reacting gas supply amount.

Next, a method for calculating the excess supply amount will be described with reference to FIG. 10.

When a current in a variation of the current load is assumed to vary from $I_1$ to $I_2$ (a nominal width of the variation of electrical load $\Delta I$ assumed for calculating the excess supply amount), a synthetic output voltage $V_2$ of the fuel cell 1 and the capacitor 2 corresponding to the current $I_2$ is obtained from FIG. 10A.

Next, the output current $Ifc_2'$ of the fuel cell 1 corresponding to the synthetic output voltage $V_2$ is obtained from the current-voltage characteristics of the fuel cell 1, and the equilibrium reacting gas supply amount $Qa_2$ corresponding to the output current $Ifc_2'$ is obtained from the diagram of the reacting gas supply amount characteristics shown in FIG. 10B. The equilibrium reacting gas supply amount $Qa_2$ is defined as the reacting gas supply amount corresponding to the output current $I_2$. The excess gas supply amount is obtained by subtracting the equilibrium reacting gas supply amount $Qa_1$ corresponding to the output current of the fuel cell Ifc=$I_1$ from the reacting gas supply amount $Qa_2$ corresponding to the output current of $I_2$.

If the excess reacting gas supply amount corresponding to the voltage drop generated at the time of the variation of electrical load is supplied in advance to the fuel cell at the time of outputting the current $I_1$, the gas shortage of the fuel cell 1 can be avoided. The dotted line of FIG. 10B shows the reacting gas supply amount characteristics with an addition of the excess amount obtained by the method described above.

Figures 11A, 11B:
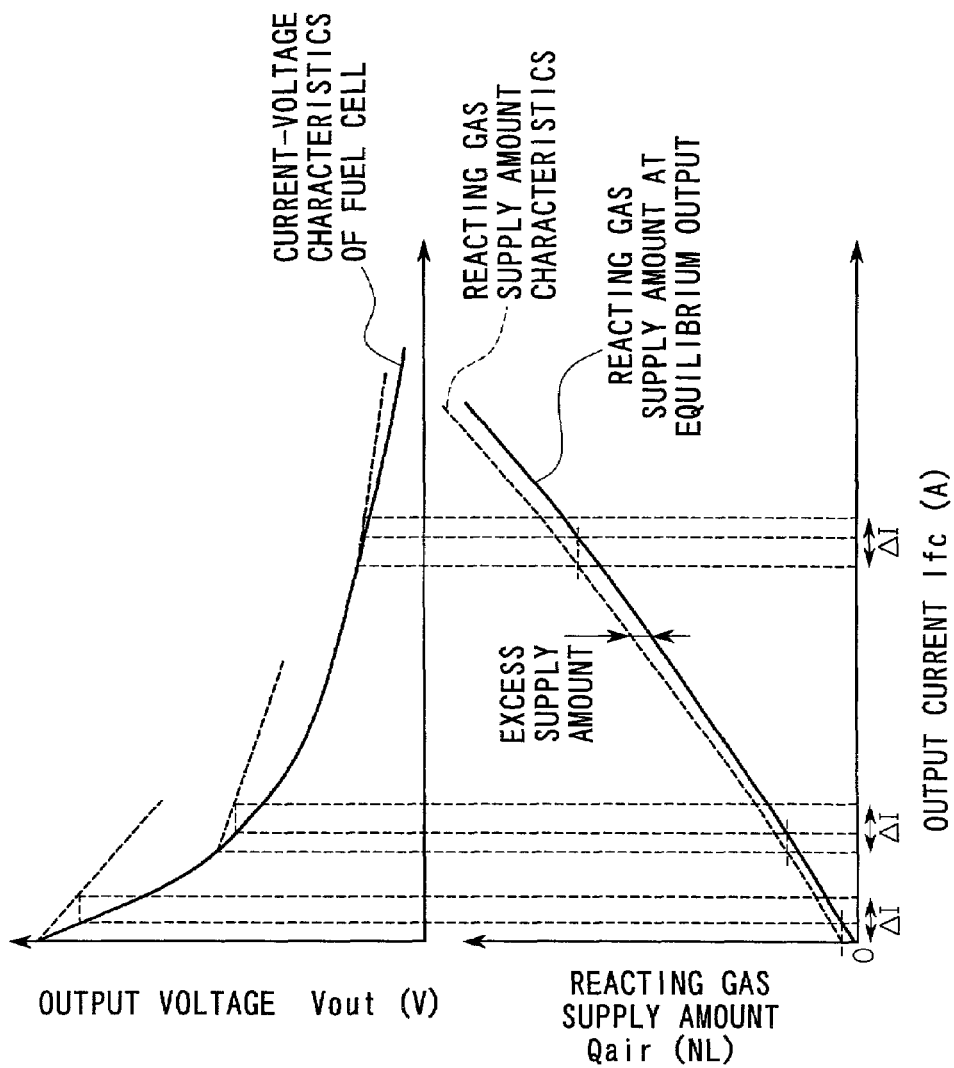
FIGS. 11A and 11B are diagrams showing the current-voltage characteristics of the fuel cell and relationship between the supply amount of the reacting gas and the current-voltage characteristics of the fuel cell.

The current-voltage characteristics of the fuel cell 1 shown in FIG. 10A is a part of the characteristic curve for simply explaining the equilibrium reacting gas supply amount. The practical characteristic curve is represented by the solid line shown in FIG. 11A. As shown in FIG. 11, the practical current-voltage characteristics of the fuel cell 1 is not represented by a linear line, but is represented by a solid curve as shown in FIG. 11A. The dotted line in FIG. 11A shows synthetic current-voltage characteristic curves of the fuel cell 1 and the capacitor 2 illustrated derived from optional equilibrium origins.

The equilibrium reacting gas supply amount corresponding to the above-described characteristic curve of the fuel cell is expressed by the solid line in FIG. 11B. The actual reacting gas amount supplied to the fuel cell 1 is shown by the dotted line in FIG. 11B.

Figures 12A, 12B:
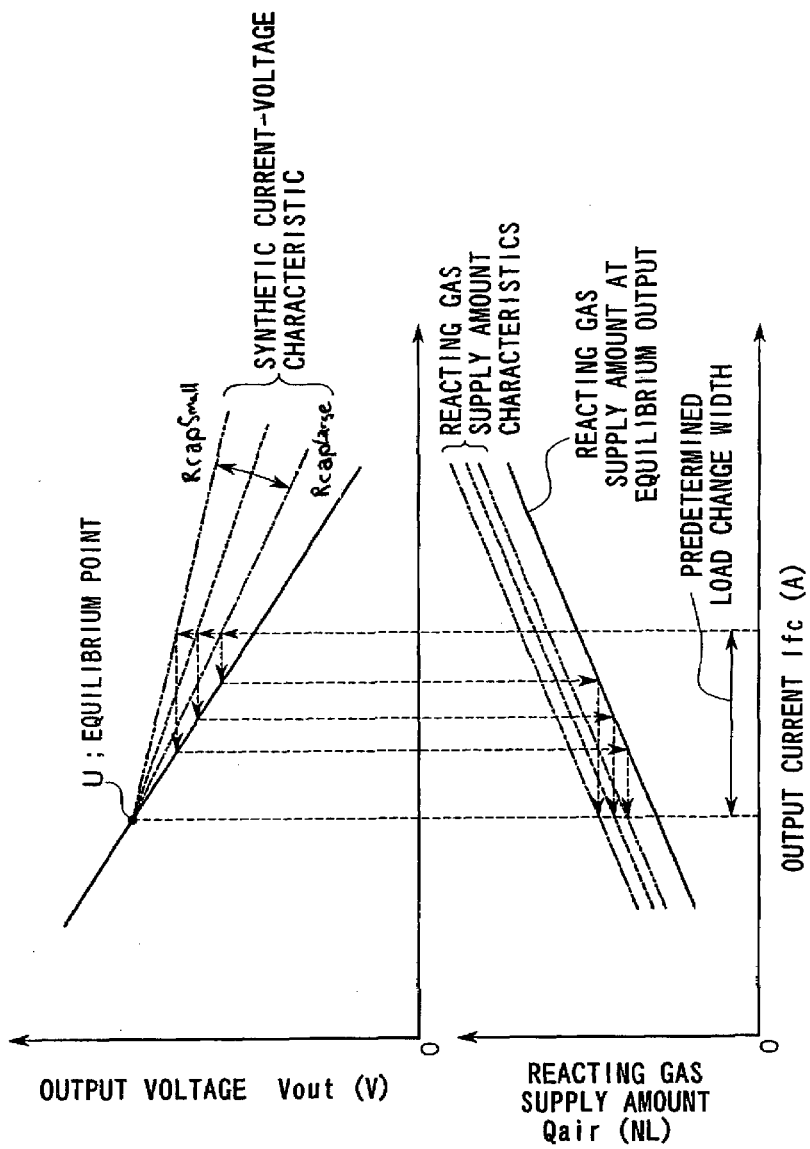
FIGS. 12A and 12B are diagrams showing the relationship between the internal resistance of the electric double layer capacitor and the supply amount of the reacting gas.

Next, with reference to FIGS. 12A and 12B, the variation of the relationship between the synthetic current-voltage characteristics and the excess supply amount according to the variation of the internal resistance Rcap of the capacitor 2.

As shown in FIG. 12A, the gradient of the synthetic current-voltage characteristics of the fuel cell 1 and the capacitor 2 increases as the internal resistance Rcap of the capacitor 2 increases. Thus, as shown in FIG. 12A, the reacting gas supply amount characteristics corresponding to each current-voltage characteristics indicates that the excess supply amount must set to a higher level as the internal resistance Rcap of the capacitor 2 is larger. In contrast, if it is desired to reduce the excess supply amount, this may be accomplished by selecting a capacitor 2 whose internal resistance is as low as possible.

Figure 13A:
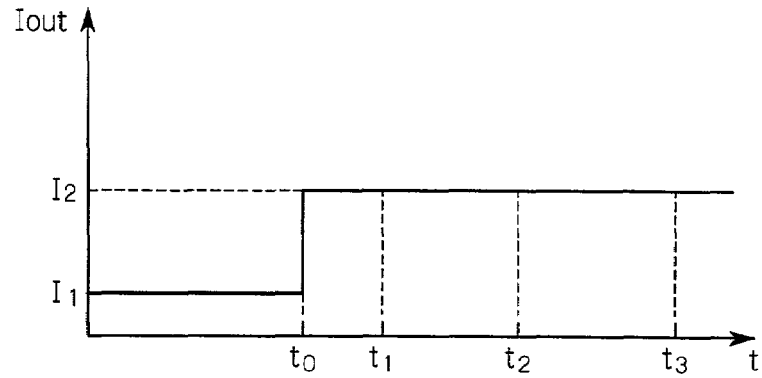
FIGS. 13A to 13C are diagrams explaining the relationship between the electrostatic capacitance of the electric double layer capacitor and the response characteristics of the reacting gas supply system.
Figure 13B:
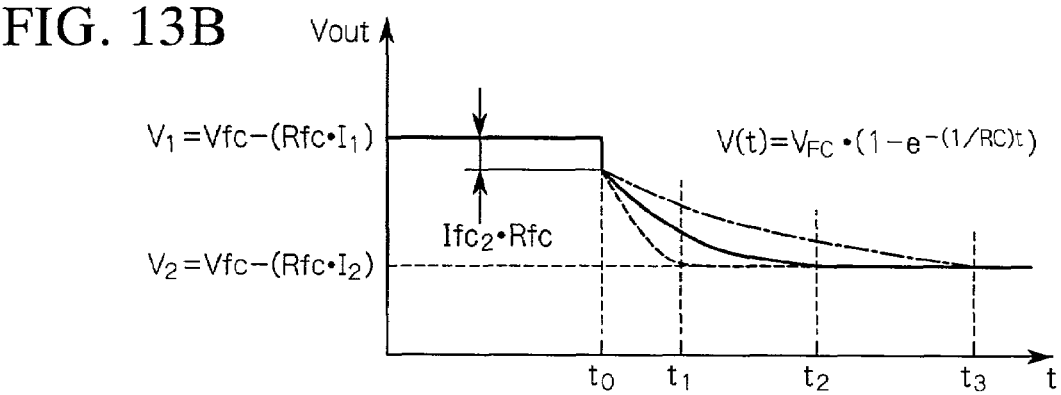
Figure 13C:
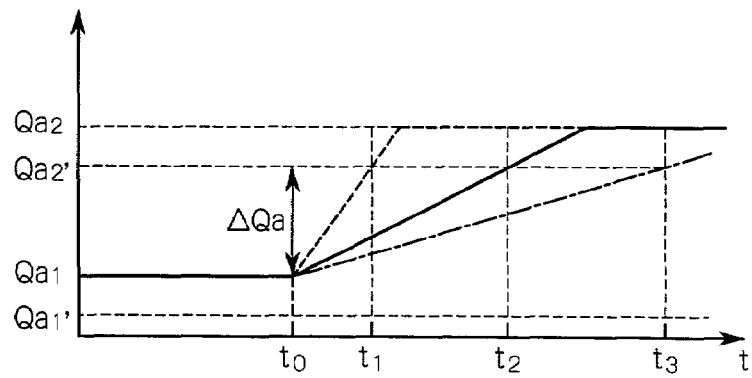

Next, the relationship between the electrostatic capacitance of the capacitor 2 and the response characteristics of the reacting gas supply unit for supplying the reacting gas to the fuel cell 1 with reference to FIGS. 13A to 13C. The fuel supply unit comprises the fuel cell 1 and the peripheral devices such as air compressor 11. The peripheral devices practically include the compressor 11, heat exchanger 13, high pressure hydrogen tank 18, electric-operated shutoff valve 19, regulator 17, ejector 20, demsiter 21, and humidifier 15.

For example, as shown in FIG. 13A, when the load current varies stepwise from $I_1$ to $I_2$, the synthetic output voltage Vout from both the fuel cell 1 and the capacitor 2 is subjected to the voltage drop $\Delta V=Ifc_2 \cdot Rfc$ corresponding to the current $I_2$ at the time of variation of electrical load momentarily, as shown in FIG. 13B. Thereafter, the synthetic output voltage transitionally decreases to the equilibrium output voltage $V_2$ corresponding to $I_2$. The transitional variation of the synthetic output voltage Vout can be expressed by the equation, $V(t)=Vfc \cdot (1-e^{-(1/RC)t})$. As shown by the equation, it takes a longer time to reach the equilibrium state (the state where the output voltage is $V_2$) when the electrostatic capacitance of the capacitor 2 is larger. Here, the time to reach the equilibrium state is longer when the electrostatic capacitance C of the capacitor 2 is larger.

FIG. 13C shows the time dependent variation of the reacting gas supply amount. The solid, dotted, and chain lines in FIG. 13C corresponds to respective characteristic curves shown in FIG. 13B.

Figure 14:
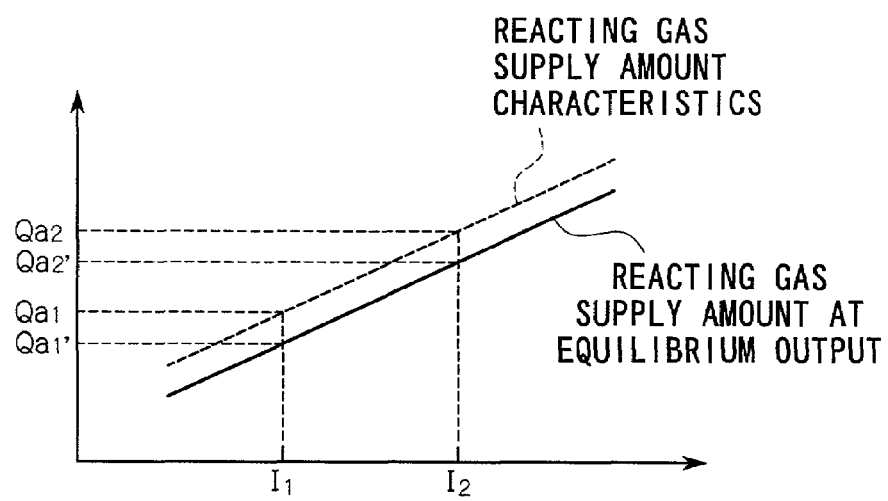
FIG. 14 is a diagram showing the reacting gas supply amount characteristics for obtaining the reacting gas supply amount as a function of the output current.

The reacting gas supply amounts $Qa_1'$, $Qa_1$, $Qa_2'$, $Qa_2$ in FIG. 13C represent, respectively, the equilibrium reacting gas amount $Qa_1'$ at the load current $I_1$ before the variation of electrical load, the reacting gas supply amount $Qa_1$ including the excess supply amount at the load current $I_1$, the equilibrium reacting gas supply amount $Qa_2'$ at the load current $I_2$ after the variation of electrical load, and the reacting gas supply amount $Qa_2$ including the excess supply amount at the load current $I_2$, as shown in FIG. 14.

The response time of the variation of the reacting gas supply amount to the fuel cell 1 from the reacting gas supply amount $Qa_1$ before the variation of electrical load to the equilibrium reacting gas supply amount $Qa_2'$ is required to be short. This is, if the capacitor 2 cannot supply the necessary amount of output corresponding to the current $I_2$ after the variation of electrical load within a period of time (the output assistance operation period) in which the capacitance can assist the output corresponding to the variation of electrical load, the output from the fuel cell 1 and the capacitance 2 is deficient, which results in causing the gas shortage state occuring in the fuel cell 1.

Accordingly, as shown in FIG. 13C, it is necessary to increase the reacting gas supply amount to an amount of $Qa_2'$ before the output assistance operation period of the capacitor 2 elapses, that is, before the synthetic output voltage of the fuel cell 1 and the capacitor 2 reaches a synthetic output voltage $V_2$.

Therefore, it is necessary to construct a reacting gas supply unit or to adopt a capacitor 2, such that the above-described response characteristics can be achieved.

The aforementioned electrostatic capacitance of the capacitor and the response characteristics of the reacting gas supply unit will be explained below in detail with reference to FIG. 9.

Figure 9:
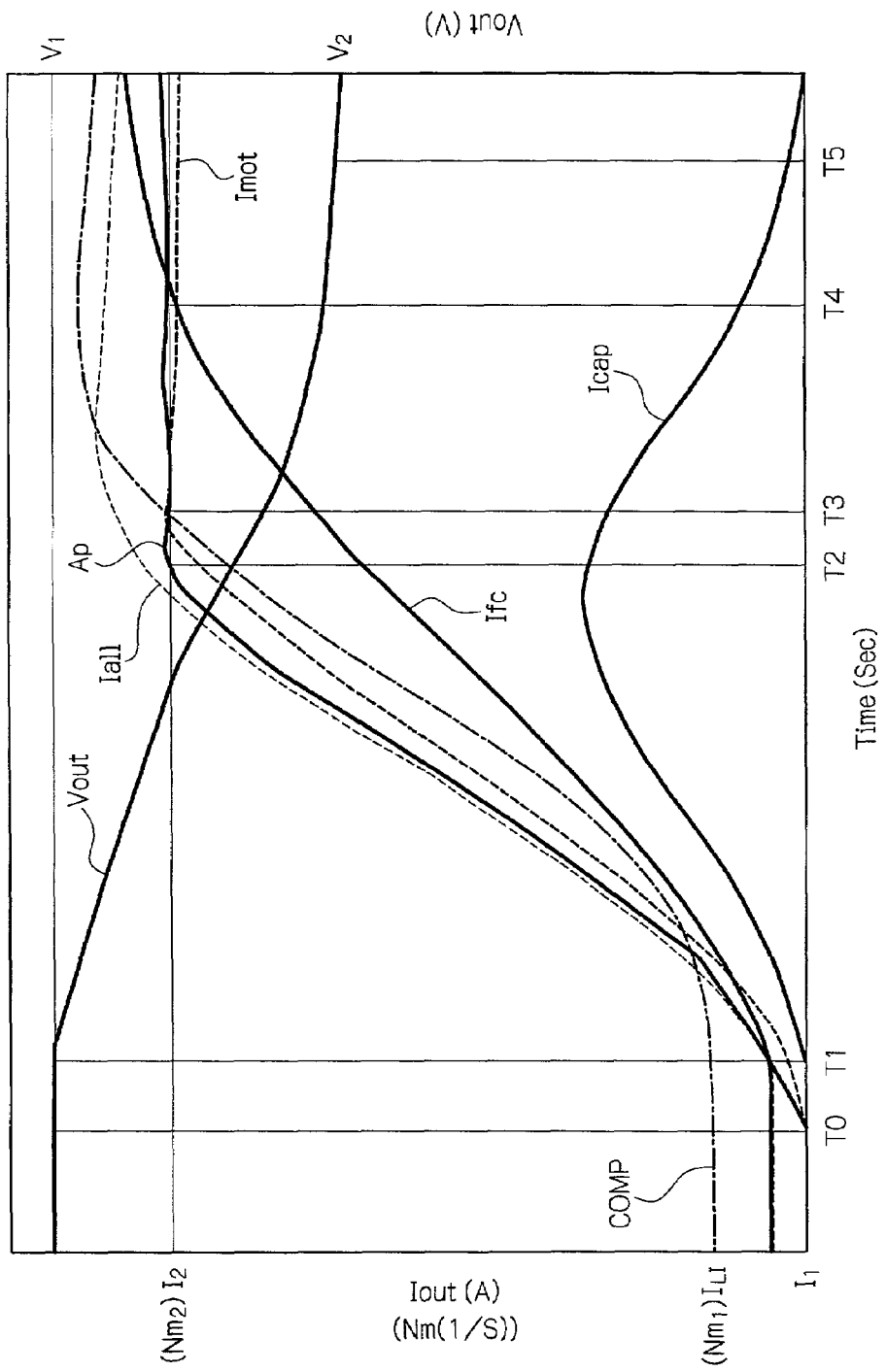
FIG. 9 is a diagram showing various response characteristics of the fuel cell power supply unit according to one embodiment of the present invention.

FIG. 9 is a diagram showing the response characteristics of the fuel cell power supply unit 10 during the variation of electrical load. As shown in the figure, the require torque Ap varies from $I_1$ to $I_2$ from time T1 to time T2 according to the variation of the depression amount of the accelerator pedal, when a driver depresses the accelerator pedal. In addition, following to the variation of the required torque Ap, the motor required current Imot varies from $I_1$ to $I_2$ accompanying a small delayed time.

As a representative response characteristic of the reacting gas supply amount to the fuel cell, FIG. 9 illustrates a relationship between the amount of reacting gas supplied by the compressor 11 and the equilibrium rotation speed to the reacting gas amount. The rotation speed which is in equilibrium with the reacting gas supply amount at the time T0 before the variation of electrical load is $Nm_1$. The rotation speed starts to vary at time $T_1$ after a certain time delay, and reaches a rotation speed $Nm_2$ corresponding to the output current $I_2$ at time T3 and the rotation speed further increases until it reaches an equilibrium rotation speed corresponding to a value including an excess reacting gas supply amount in addition to the rotation number $Nm_2$ after the variation of electrical load.

The output current of the fuel cell 1 starts increasing after the variation of electrical load with the increasing amount of the reacting gas, and at time T4, the output current reaches an equilibrium current $I_2$, the fuel cell outputs a higher current than $I_2$ for a while, and thereafter the output current converges to the current $I_2$.

On the other hand, the capacitor 2 discharges electric power for assisting the output power while the output power of the fuel cell is shortage. The capacitor 2 starts discharging the power at time T1 and the output current of the capacitor 2 varies along the variation of the output current of the fuel cell 1 until the output current of the fuel cell 1 reaches the equilibrium state.

As a result, the synthetic output current Iall of the output currents of the fuel cell 1 and the capacitor 2 varies so as to satisfy the required torque Ap.

The synthetic output voltage Vout of the fuel cell 1 and the capacitor 2 starts decreasing from time T1 and reaches an equilibrium voltage after the variation of electrical load at time T5.

As shown in FIG. 9, when a variation of electrical load is applied, the amount of the reacting gas supplied from the reacting gas supply unit of the fuel cell 1 varies from the supply amount of the reacting gas before the variation of electrical load at time T0, that is, the supply amount equilibrated with the rotation speed $Nm_1$ of the compressor 11 to a supply amount (for example, supply amount corresponding to the rotation speed $Nm_2$) required to output at least an output current (for example, $I_2$) after the variation of electrical load at time T3. In the above case, the response time of the reacting gas supply unit is T3-T0. Note that the above-described response time corresponds the changing time of the synthetic output voltage Vout of the fuel cell 1 and the capacitor 2 from a equilibrium voltage at T0 reaches the output voltage $V_2$ corresponding to an equilibrium current $I_2$ after the variation of electrical load. The excess amount of the reacting gas to be supplied to the fuel cell 1 and the capacitor characteristics is determined such that the output assistance operation period of the capacitor 2, that is, the time period of T5-T0, is longer than the above-described time period of T3-T0.

As shown above, when a subscribed variation of electrical load is set, it is possible to avoid the gas shortage state of the fuel cell by setting the necessary amount of the reacting gas supplied to the fuel cell in addition to the amount of the reacting gas equilibrated before the variation of electrical load and the capacitor characteristics such that the supply amount of the reacting gas to the fuel cell reaches an amount required for outputting at least an equilibrium current after the variation of electrical load before the synthetic output voltage of the fuel cell 1 and the capacitor 2 reaches a voltage equilibrated with an equilibrium current after the variation of electrical load.

Note that the amount of the reacting gas to be supplied to the fuel cell 1 from the reacting gas supply unit is set by the control device 4 based on a target generation amount. This target generation amount is calculated by the control device 4 based on various input signals indicating the driving state of the vehicle such as the accelerator pedal opening, the vehicle speed, and power consumption of auxiliary devices (see FIG. 4). Accordingly, it is necessary to calculate the target generation amount including the excess supply amount in order to supply the reacting gas amount including the excess reacting gas amount.

When the variation of electrical load is encountered as shown in FIG. 8A, the control device 4 sets a target generation quantity, as shown in FIG. 8B, including an excess generation quantity. If the load output varies stepwise at time $t_0$ and the voltage drop takes place, it is thereby possible to prevent gas shortage of the fuel cell 1 by supplying an excess amount of the reacting gas in advance for filling the shortage amount of the reacting gas by the voltage drop.

The control device calculates the target generation command value at predetermined intervals and a width of the variation of electrical load is obtained by comparing two target generation command quantities. The width of the variation of electrical load is obtained by comparing two command values, for example, between the newest target generation command value and the previous target generation command value, and the newest generation command value is updated such that the width of the variation of electrical load used for setting the excess amount becomes lower than the above-described predetermined width of the variation of electrical load.

In other words, when a target generation command value is set based on the various types of input signals indicating the driving state of the vehicle, and when the width of the variation of electrical load exceeds the predetermined width of the variation of electrical load $\Delta I$ with respect to the previous target generation command value, the newest target generation quantity is updated such that the width of the variation of electrical load becomes less than $\Delta I$.

The reasons for setting such correction is that if the width of the variation of electrical load exceeds the predetermined width of the variation of electrical load $\Delta I$, the fuel cell 1 can not output a required amount of output power, which results in entering into the gas shortage state in the fuel cell.

The control device always set the target generation quantity so as to satisfy the above conditions, and so as not to require the fuel cell 1 to output the power exceeding the target supply amount, and the fuel cell 1 is protected from being in the gas shortage state.

As described above, an explanation is provided that the fuel cell 1 substantially directly connected to the capacitor 2 is used for the fuel cell power supply unit according to one embodiment of the present invention. However, in practice, a current limiting device (not shown) is provided between the fuel cell 1 and the capacitor 2. Hereinafter, the current limiting device is described with reference to FIG. 1.

Immediately after the start of the vehicle, for example, the electric power is mainly supplied by the capacitor 2. Therefore, the remaining charge of the capacitor rapidly decreases and the potential of the capacitor becomes relatively low when compared with the potential of the fuel cell. If the capacitor 2 in this state is substantially directly connected to the fuel cell 1, a large current flows from the fuel cell 1 to the capacitor 2 and the potential of the fuel cell also decreases rapidly.

The fuel cell 1 is directed into the state where the amount of the reacting gas becomes shortage, that is, the gas shortage state. Accordingly, while there is a large potential gap between the fuel cell 1 and the capacitor 2, it is necessary to limit the output current of the fuel cell 1 for preventing the fuel cell 1 from the gas shortage state. Thus, in the present invention, while starting the vehicle wherein the potential difference between the fuel cell 1 and the capacitor 2 is large, the output current of the fuel cell 1 is controlled by the current limiting device (not shown), while charging the capacitor 2. Thereafter, when the potential difference between the fuel cell and the capacitor 2 becomes lower than a predetermined potential difference, the control of the output current from the fuel cell is stopped and the fuel cell 1 and the capacitor 2 are used in a directly connected state.

Consequently, at the starting period of the vehicle, a current limiting device, constituted by a device such as a chopper-type DC/DC converter, is provided between the fuel cell 1 and the capacitor 2, similarly to the conventional case. A switching device provided in the current limiting device thereby limits the output current from the fuel cell 1 by its ON/OFF operation. However, after the vehicle has been started, and the vehicle arrives at the state wherein the potential difference between the fuel cell 1 and the capacitor 2 becomes less than a predetermined potential difference, it becomes unnecessary to limit the output current from the fuel cell, the current limiting device stops its operation, the switching device is preserved at the ON state, and the fuel cell 1 and the capacitor enter in the directly connected state.

As described above, although the present unit practically includes the current limiting device between the fuel cell 1 and the capacitor 2, the current limiting device does not execute the switching operation when the power supply unit is used in the actual driving operations as described above. Thus, in the actual driving operation, the fuel cell power supply unit operates as if the current limiting device does not exist.

Although some embodiments of the present invention have been described with reference to the attached drawings, this invention is not limited to the embodiments described above. Variants thereof can be envisaged which do not exceed the scope of the present invention.

As described above, according to a fuel cell power supply unit of the present invention, the present invention provides a fuel cell power supply unit with a high power efficiency by using the fuel cell and the capacitor connected in parallel. The fuel cell power supply unit of the present invention is used by firstly obtaining the voltage of the fuel cell after the variation of electrical load based on the synthetic current-voltage characteristics of the fuel cell and the capacitor starting from an equilibrium point of the current-voltage characteristics of the fuel cell, secondly obtaining the current corresponding to the above-obtained voltage based on the current-voltage characteristics of the fuel cell, thirdly obtaining the supply amount of the reacting gas corresponding to the current, and supplying the reacting gas for outputting the power to the fuel cell in an amount which includes an excess gas amount in addition to the equilibrium reacting gas supply amount, so that the present invention realizes a fuel cell power supply unit having a high power output efficiency while protecting the fuel cell from entering into the gas shortage state. At the same time, the fuel cell power supply unit of the present invention stops the operation of the current limiting device when the potential difference between the fuel cell and the capacitor is rendered to be lower than the predetermined difference and the fuel cell supply unit is used at the state wherein the fuel cell and the capacitor are substantially directly connected.

The present invention is capable of providing an excess supply amount, which is the minimum necessary amount of the reacting gas to be supplied to the fuel cell for coping with a voltage drop, so that it is possible to avoid supplying useless reacting gas and to supply the reacting gas efficiently.

According to the fuel cell power supply unit of the present invention, the reacting gas supply amount is determined based on the current-voltage characteristics of the fuel cell, the current-voltage characteristic of the capacitor, and the reacting gas supply amount at the equilibrium state corresponding to the current-voltage characteristics of the fuel cell, so that the reacting gas supply amount for coping with the voltage drop can be obtained accurately, which makes it possible to improve performance of the fuel cell power supply unit.

According to the fuel cell power supply unit of the present invention, since the current-voltage characteristics of the fuel cell is dependent on an internal resistance of the fuel cell and an average internal resistance within a output current range, the reacting gas supply amount to the fuel cell at the time of variation of electrical load is determined dependent on the internal resistance of the fuel cell. The detailed determination of the reacting gas supply amount by the internal resistance of the fuel cell makes it possible to supply the optimum amount of the reacting gas while preventing the gas shortage state of the fuel cell, which results in improving the performance of the fuel cell power supply unit.

According to the fuel cell power supply unit of the present invention, the reacting gas supply amount is determined based on the internal resistance of the electric double layer capacitor because the current-voltage characteristics of the capacitor is dependent on the internal resistance and the electrostatic capacitance of the capacitor. The detailed determination of the reacting gas supply amount by the internal resistance of the capacitor makes it possible to supply the optimum amount of the reacting gas while preventing the gas shortage state of the fuel cell, which results in improving the performance of the fuel cell power supply unit.

According to the fuel cell power supply unit of the present invention, since the reacting gas amount supplied to the fuel cell is determined such that the response time reaching from a reacting gas supply amount at an output state to the reacting gas supply amount after the variation of electrical load is lower than the output assisting time by the capacitor, the reacting gas is supplied efficiently to the fuel cell while preventing the fuel cell from being gas shortage, and the present invention has realized a fuel cell power supply unit which has a high power output efficiency.

According to the fuel cell power supply unit of the present invention, since the response time of the reacting gas supply system is determined so as to be lower than the output assisting time by the capacitor, the reacting gas is supplied efficiently to the fuel cell while preventing the fuel cell from being gas shortage, and an effect is obtained that a fuel cell power supply unit has a high power output efficiency.

According to the fuel cell power supply unit of the present invention, since the capacitance of the capacitor is determined such that the response time of the reacting gas supply system is lower than the output assisting time by the capacitor, the reacting gas is supplied efficiently to the fuel cell while preventing the fuel cell from being gas shortage, and an effect is obtained that a fuel cell power supply unit has a high power output efficiency.

In a fuel cell power supply unit, whose reacting gas supply amount to be supplied to the fuel cell is determined based on a target generation command value, while calculating the target output command value for driving the motor and the target generation command value for the fuel cell at a predetermined interval based on the input signals indicating the driving state of the vehicle, since the width of the variation of electrical load (the difference between two generation command values) obtained based on two sequentially obtained target generation command quantities (the newest generation command value and the previous generation command value) is controlled so as to be lower than the predetermined width of the variation of electrical load (for example, the width of the variation of electrical load $\Delta I$).

Thus, it is possible to prevent the fuel cell from being gas shortage by controlling so as not to require excessive output power which will resulted in the shortage state of the reacting gas for the fuel cell.

According to the fuel cell power supply unit of the present invention, a current limiting device (for example, as shown in the embodiment, a current limiting device comprising a chopper-type DC/DC converter) provided between the fuel cell and the capacitor, functions for charging the capacitor (when the current limiting device is a chopper-type DC/DC converter, the switching device in the converter performs switching operations) at the time of starting the vehicle, whereas the fuel cell and the capacitor are rendered to the directly connected state when the potential difference between the fuel cell and the capacitor is reduced to be lower than a predetermined potential difference (for example, the fuel cell does not fall into the gas shortage state).

Since the fuel cell and the capacitor can be substantially directly connected as described above, it is possible to avoid the power loss by the switching operation in the current limiting device and it is also possible to supply the power to the load effectively.

What is claimed is:

1. A fuel cell power supply unit comprising:
   an electrochemical fuel cell;
   an electric double layer capacitor, which is directly connected with the fuel cell; and
   a controller programmed for supplying an excess supply amount of a reacting gas to the fuel cell when an output current of the fuel cell corresponds to a first output current ($I_1$) by,
   determining an expected output current ($I_2$) based on one or more input signals indicative of acceleration of the vehicle,
   obtaining from data representative of a synthetic current-voltage characteristic ($I_{all}$ all vs. $V_{out}$) of the fuel cell an expected output voltage ($V_2$) corresponding to the expected output current ($I_2$),
   obtaining from data representative of a current-voltage characteristic of the fuel cell corresponding to a minimal amount of reacting gas supplied to the fuel cell a second output current ($I_{fc2'}$) corresponding to the expected output voltage ($V_2$),
   obtaining a supply amount of reacting gas ($Qa_1$) corresponding to the second output current ($I_{fc2'}$),
   determining the excess supply amount of the reacting gas based on the supply amount of reacting gas ($Qa_1$) corresponding to the second output current ($I_{fc2'}$), and
   supplying the reacting gas in an amount which includes the excess supply amount in addition to an equilibrium reacting gas supply amount ($Qa_{1'}$) when the output current of the fuel cell corresponds to the first output current ($I_1$).

* * * * *